No. 759,781. Patented May 10, 1904.

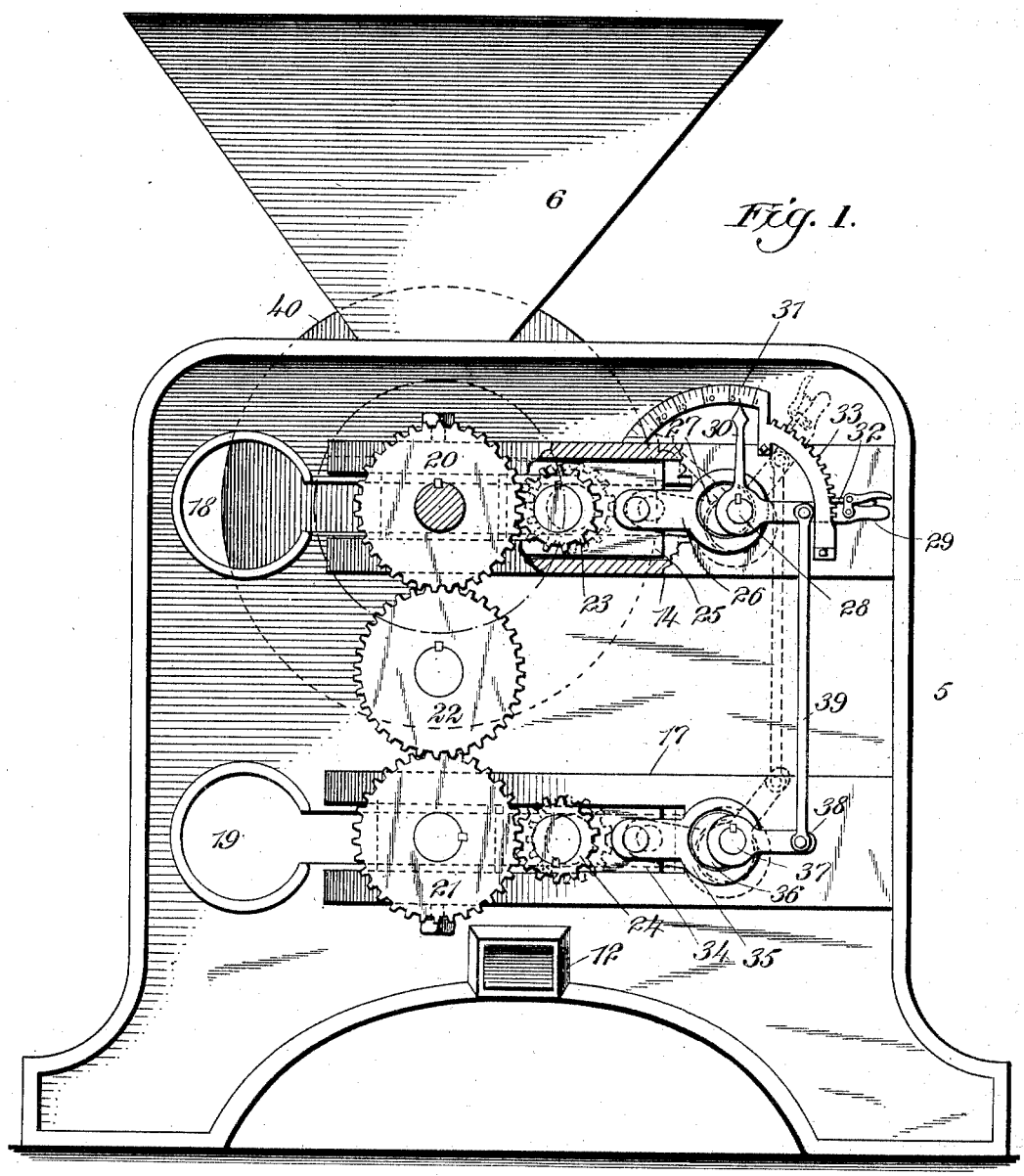

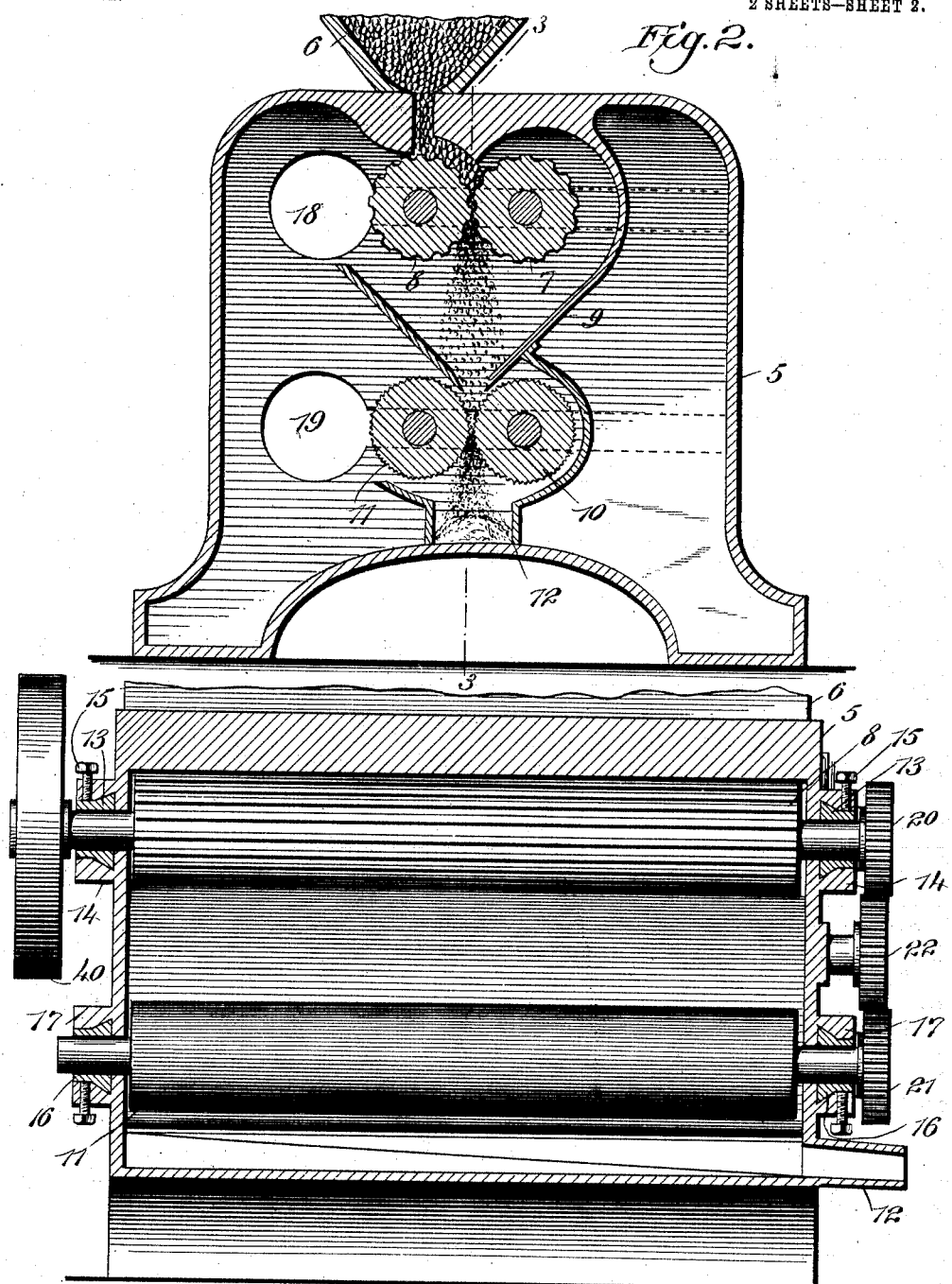

UNITED STATES PATENT OFFICE.

SAMUEL THOMAS WALLACE, OF LOS ANGELES, CALIFORNIA.

COFFEE-MILL.

SPECIFICATION forming part of Letters Patent No. 759,781, dated May 10, 1904.

Application filed August 14, 1903. Serial No. 169,478. (No model.)

*To all whom it may concern:*

Be it known that I, SAMUEL THOMAS WALLACE, a citizen of the United States, and a resident of Los Angeles, in the county of Los Angeles and State of California, have invented a new and Improved Coffee-Mill, of which the following is a full, clear, and exact description.

This invention relates to improvements in coffee-mills, an object being to provide a mill of simple construction having novel means for adjusting the rolls for different degrees of grinding and by means of which the grinding may be rapidly done.

I will describe a coffee-mill embodying my invention and then point out the novel features in the appended claims.

Reference is to be had to the accompanying drawings, forming a part of this specification, in which similar characters of reference indicate corresponding parts in all the figures.

Figure 1 is a side elevation of a coffee-mill embodying my invention. Fig. 2 is a sectional elevation thereof, and Fig. 3 is a section on the line 3 3 of Fig. 2.

Referring to the drawings, 5 designates the casing of the mill, having a hopper 6, in which the coffee to be ground is placed. Arranged in the casing are granulating-rolls 7 8, below which is a hopper 9 for directing the pulverized coffee to the granulating-rolls 10 11, from which the pulverized coffee passes out through a spout 12. The rolls 7 8 are provided with comparatively large longitudinal ribs, while the ribs of the rolls 10 11 are very much smaller. The shaft of the roll 8 extends through slots formed in the opposite side walls of the casing 5 and has bearings in boxes 13, mounted to slide in guides 14, and the roll 7 has its shaft-bearings in similar boxes arranged to slide in the said guides 14. The boxes 13 may be held as adjusted by means of set-screws 15. The boxes for the roll 7, however, are designed to slide relatively to the boxes 13, so as to adjust the space between the rolls 7 8, as will be hereinafter described.

The lower pulverizing-roll 11 has bearings in boxes 16, arranged to slide in guides 17, the opposite walls of the casing being slotted to permit of the movement of the roll, and the other pulverizing-roll 10 has its shaft-bearings in boxes sliding in the guides 17.

To permit the insertion or removal of the rolls for the purpose of cleaning or the like, the side walls of the casing 5 are provided with openings 18 19, through which the rolls may be passed and then with their boxes slid into place. A gear-wheel 20 on the outer end of the shaft of the roll 8 has driving connection with a gear-wheel 21 on the shaft of the roll 11 through the medium of an idler-gear 22. The gear 20 is designed to engage with a pinion 23 on the shaft of the roll 7, and the gear 21 is designed to engage with a pinion 24 on the shaft of the roll 10. By these gear connections the rolls 7 10 have a much faster motion than their companion rolls, thus causing the coffee to pass quickly through the rolls, and at the same time to be granulated and ground.

From the bearing-boxes 25 for one end of the shaft of the roll 7 an eccentric-link 26 extends and receives an eccentric 27, mounted on a shaft 28, and rigidly attached to the shaft is an operating-lever 29, and also attached to the shaft and arranged at substantially right angles to the lever 29 is a pointer 30, movable over a graduated plate 31. Carried by the lever 29 is a pawl 32 for engaging with a rack 33. Pivotally connected to the bearing-box 34 for one end of the shaft of the roll 10 is an eccentric-link 35, receiving an eccentric 36, mounted on a shaft 37, from which an arm 38 extends and is connected by means of a link 39 with the lever 29. One of the shafts, here shown as the shaft for the roll 8, is provided with a band-wheel 40. It is to be understood, however, that the rolls may be operated by any desired means.

By the eccentric mechanism above described it is obvious that the rolls 7 10 may be simultaneously adjusted with relation to their companion rolls, and the degree of grinding desired may be ascertained by the pointer 30, movable over the graduated plate 31.

The operation of the machine is quite clear—that is, the coffee in passing between the rolls 7 8 will be cracked or granulated and upon passing between the rolls 10 11 will be pulverized to the desired fineness.

By employing rolls instead of disks, as are usually employed in coffee-grinders, the mill has a much greater capacity than such mills having disks.

Having thus described my invention, I claim as new and desire to secure by Letters Patent—

1. A coffee-mill comprising a casing having openings in one of its side walls through which the rolls may pass and also having slots extended from said openings, guides on the outer sides of the casing arranged adjacent to said slots, bearing-boxes arranged to slide in the guides, granulating-rolls having bearings in the upper bearing-boxes, pulverizing-rolls having bearings in the lower bearing-boxes, means for simultaneously adjusting one of each pair of rolls relatively to its companion roll, a graduated plate, a pointer movable along the plate by said adjusting means and gear connections between the rolls.

2. In a coffee-mill, a casing, a pair of granulating-rolls arranged in the casing, a pair of pulverizing-rolls arranged below the granulating-rolls, sliding bearing-boxes for one of the granulating-rolls, sliding bearing-boxes for one of the pulverizing-rolls, eccentric-links extended from the bearing-boxes at one end of the casing, eccentrics with which said links engage, a link connection between the eccentrics, a lever for operating the eccentrics, a pointer carried by one of the eccentrics, and a graduated plate over which said pointer is movable.

3. A mill comprising a pair of granulating-rolls adjustable one relatively to the other, a pair of pulverizing-rolls adjustable one relatively to the other, and adjusting mechanism for the adjustable rolls and comprising eccentrics, a pointer carried by one of the eccentrics, and a graduated plate over which the pointer is movable.

In testimony whereof I have signed my name to this specification in the presence of two subscribing witnesses.

SAMUEL THOMAS WALLACE.

Witnesses:
H. G. MILLER,
R. F. BOSTWICK.